US006993568B1

(12) United States Patent
Hauduc et al.

(10) Patent No.: US 6,993,568 B1
(45) Date of Patent: Jan. 31, 2006

(54) SYSTEM AND METHOD FOR PROVIDING LANGUAGE LOCALIZATION FOR SERVER-BASED APPLICATIONS WITH SCRIPTS

(75) Inventors: Ludovic Hauduc, Kirkland, WA (US); Tuna Ertemalp, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1014 days.

(21) Appl. No.: 09/704,073

(22) Filed: Nov. 1, 2000

(51) Int. Cl.
*G06F 15/16* (2006.01)
(52) U.S. Cl. ............... 709/217; 709/219; 709/203; 707/100; 704/8
(58) Field of Classification Search ........ 709/217–218, 709/329, 203; 345/733; 707/100; 704/8
See application file for complete search history.

(56) References Cited

U.S. PATENT DOCUMENTS

| | | | | |
|---|---|---|---|---|
| 5,986,654 | A * | 11/1999 | Alexander et al. | 715/744 |
| 6,297,819 | B1 * | 10/2001 | Furst | 345/733 |
| 6,324,500 | B1 * | 11/2001 | Amro et al. | 704/8 |
| 6,360,246 | B1 * | 3/2002 | Begley et al. | 709/203 |
| 6,421,733 | B1 * | 7/2002 | Tso et al. | 709/246 |
| 6,490,547 | B1 * | 12/2002 | Atkin et al. | 704/8 |
| 6,519,557 | B1 | 2/2003 | Emens et al. | |
| 6,718,519 | B1 | 4/2004 | Taieb | |
| 2001/0051998 | A1 * | 12/2001 | Henderson | 709/217 |
| 2002/0049831 | A1 * | 4/2002 | Platner et al. | 709/218 |
| 2002/0062396 | A1 | 5/2002 | Kakei et al. | |
| 2002/0077712 | A1 | 6/2002 | Safaei et al. | |
| 2002/0112093 | A1 * | 8/2002 | Slotznick | 709/329 |
| 2002/0138649 | A1 | 9/2002 | Cartmell et al. | |
| 2002/0193983 | A1 | 12/2002 | Tokieda et al. | |
| 2003/0135501 | A1 * | 7/2003 | Frerebeau et al. | 707/100 |

FOREIGN PATENT DOCUMENTS

WO    WO-9718516    *  5/1997

OTHER PUBLICATIONS

U.S. Appl. No. 09/704,067, filed Nov. 1, 2000.

* cited by examiner

*Primary Examiner*—Wen-Tai Lin
(74) *Attorney, Agent, or Firm*—Perkins Coie LLP (57) ABSTRACT

Using a server in a distributed computer network to provide an application and supplemental script content to a client in the client's preferred language. A client accesses an application on a server and provides a preferred language for the application. Language pack software modules on the server take the content of the application and convert it into the language desired by the client. The translated application is then sent by the server to the client. A component of the language pack software module is also downloaded from the server to the client for converting supplemental content. A browser residing on the client will retrieve supplemental content from the application on the server. After the language pack component converts the supplemental content, a client script renders it to enhance the application. This approach eliminates the need to create separate applications with separate script content for each language and allows the client to change languages instantaneously.

20 Claims, 8 Drawing Sheets

SYSTEM AND METHOD FOR PROVIDING LANGUAGE LOCALIZATION FOR SERVER-BASED APPLICATIONS WITH SCRIPTS

TECHNICAL FIELD

The present invention is generally directed to providing application content in a distributed computing environment in a variety of different languages. More specifically, the present invention supports a server-based translation of content of an application and a client-based translation of supplemental content for scripts without altering the code for the application or the supplemental content. The invention makes this possible without reproducing separate versions of the application and supplemental content in desired languages.

BACKGROUND OF THE INVENTION

The Internet has quickly become a popular means for transmitting information because of the world-wide access it provides to information resources. The information on the Internet is available in a variety of formats and it can have educational, entertainment, or business purposes. The World Wide Web (the "Web") is one of the largest and most popular distributed computing networks that make-up the Internet. The Web comprises interconnected computers from around the world. A computer connected to the Internet can download digital information from Web server computers. The Web comprises resources and clients that communicate digital information and instructions typically using a format known as Hypertext Markup Language (HTML). These instructions can include information for formatting text, linking to digital data, and receiving digital data.

One of the assets of the Web, world-wide interconnectivity, can also be an obstacle in that people around the world speak different languages. The information generated by Web server computers is typically in one language. This limits the usefulness and value of the Web server computer on a global scale. The problem is compounded by the existence of scripts (or ActiveX controls), which are simple programs running on the client that enhance the information generated by the Web server computer.

The conventional approach to solving this problem is to design a single Web page in one language that permits a client to choose a language from a limited list of languages supported by the site. Copies of the Web applications are reproduced in the languages supported by the site. Similarly, separate versions of the content to be processed by the client's scripts are created. Once the client makes a language selection, it is directed to one set of the Web applications and the corresponding script content in the chosen language.

There are limitations with the conventional approach. First, this is a labor-intensive solution in that separate sets of Web applications and script content must be created for each language. Any time the Web application or script content is changed or updated, each version of the Web application and script content must be changed to make that language's version current. Maintaining a separate version of the Web application and script content for each language is time consuming and limits the practical ability to support many different languages. The conventional approach also does not allow a client to change languages in the midst of using a Web application or script, but requires the client to return to the beginning of the Web application. The client then chooses the alternate language and proceeds from the beginning of that version of the Web application.

In view of the foregoing, there is a need in the art for a method and system which will allow Web applications and scripts to support many different languages. Specifically, there is a need for Web applications to provide content in various languages without separate versions of the application for each language. There is a further need to change Web applications and script content to keep them current without having to alter the same element in each language version. There is also a need for clients to be able to use scripts in their desired language to supplement Web applications. Finally, a need exists in the art for a client to change languages at any point in using a Web application or script without having to return to the beginning of the Web application and repeat steps in another language.

SUMMARY OF THE INVENTION

The present invention is generally directed to software modules operating in a distributed computing environment. Specifically, the invention is designed to operate on a wide area network such as the World Wide Web (the "Web"). The Web comprises Web pages or Web applications that reside on computer servers in a network and that can be accessed by clients. The present invention operates in a distributed computing environment with at least one server and clients connected to the server. To enable the client to receive an application in a desired language, the server determines the client's language preference. Using software modules residing on the server called language packs, the server can convert the application content to the client's preferred language. Upon completing the translation, the server can send the localized content to the client.

The present invention can provide the content of a Web application in different languages, called localization, with language pack software modules maintained at the server. The single application contains elements that make-up the content of the application and are encoded as strings. The invention enables the conversion of the string elements that make-up the content of the application into various languages without altering the underlying code of the application. The localization process at the server takes these string elements and replaces them with the content of a specific language. Localization is accomplished with language pack software modules residing on the server. Language packs can convert the content of the Web pages into the desired language and render the translated content for the Web client.

The invention also allows the client to use scripts to enhance the application. Typically, at the time the client accesses an application on a server, component language packs can be downloaded from the server to the client for converting supplemental content at the client. Additional encoded strings from the application comprise supplemental content for processing by the client script. The client retrieves these additional encoded strings and, using the component language pack, converts them to the selected language. A script residing on the client utilizes these supplemental strings to enhance the application by providing interactivity and functionality, such as popup menus and additional graphics.

Existing Web applications do not permit efficient conversion of content into many languages. The conventional approach involves creating a homepage in one language and then providing links from the homepage to duplicate sets of Web pages. Each duplicate set is translated into a different language and has accompanying content for client scripts. In contrast, the present invention requires only one set of Web pages and one version of script content for the specific Web application. This approach permits the Web client to choose a new language whenever it desires and eliminates the need to create duplicate sets of Web pages for each language. The invention also facilitates updating the Web application in that changes in the computer code only need to be made once instead of in each language version.

DETAILED DESCRIPTION OF THE EXEMPLARY EMBODIMENTS

The present invention allows for the server-based translation of content for an application and client scripts into a variety of different languages. Instead of creating a different version of a particular application and its accompanying supplemental content for every desired language, the present invention maintains only one version on a server computer. Files called language packs also reside on the server. Language packs contain the data for translating the application content into a desired language. When a client accesses an application residing on a server, it can choose a language for the application content to be displayed in. The data contained in the language packs is used to translate the application content. The server then sends the translation to the client.

The invention also supports the functioning of client scripts in different languages. In order to reduce subsequent delays, a component of the language pack typically is downloaded to the client when it first accesses an application on a server. This component is subsequently used to convert strings containing supplemental information for scripts residing on the client. Once the supplemental strings are converted, the script can render the supplemental information on the client. The client can also choose to change the language translation while using the server-based application or client-based script without having to exit and return to the beginning of the application. Components from more than one language pack can be downloaded to the client to support multiple languages at the client.

Although the exemplary embodiments will be generally described in the context of software modules running in a distributed computing environment, those skilled in the art will recognize that the present invention also can be implemented in conjunction with other program modules for other types of computers. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations in a distributed computing environment by conventional computer components, including remote file servers, remote computer servers, remote memory storage devices, a central processing unit (CPU), memory storage devices for the CPU, display devices and input devices. Each of these conventional distributed computing components is accessible by the CPU via a communications network.

The processes and operations performed by the computer include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

Referring now to the drawings, in which like numerals represent like elements throughout the several figures, aspects of the present invention and the preferred operating environment will be described.

Figure 1:
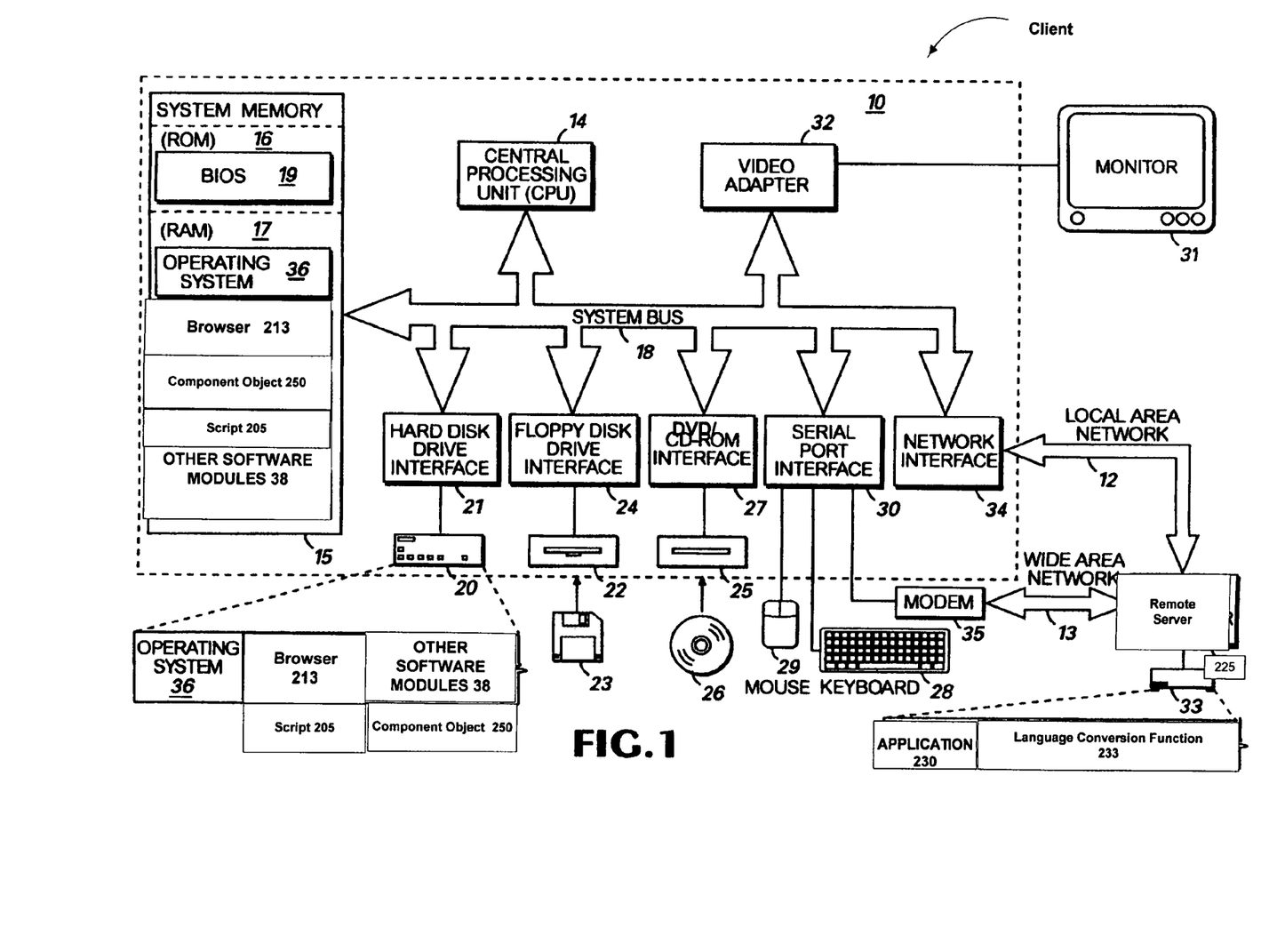
FIG. 1 is a functional block diagram illustrating the operating environment for an exemplary embodiment of the present invention.

FIG. 1 illustrates various aspects of an exemplary computing environment in which the present invention is designed to operate. Those skilled in the art will appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote server 225. The logical connections between the personal computer 10 and the remote server 225 are represented by a local area network 12 and a wide area network 13. Those of ordinary skill in the art will recognize that in this client/server configuration, the remote server 225 may function as a file server or computer server.

The personal computer 10 includes a CPU 14, such as "PENTIUM" microprocessors manufactured by Intel Corporation of Santa Clara, Calif. The personal computer also includes system memory 15, including read only memory (ROM) 16 and random access memory (RAM) 17, which is connected to the CPU 14 by a system bus 18. The preferred computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM or DVD drive 25, which is used to read a CD-ROM or DVD disk 26, is connected to the system bus 18 via a CD-ROM or DVD interface 27. A user enters commands and information in the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote server 225 in this networked environment is connected to a remote memory storage device 33. This remote memory storage device 33 is typically a large capacity device such as a hard disk drive, CD-ROM or DVD drive, magneto-optical drive or the like. Those skilled in the art will understand that program modules such as an application 230 and language conversion function 233 are provided to the remote server 225 via computer-readable media. The personal computer 10 is connected to the remote server 225 by a network interface 34, which is used to communicate over the local area network 12.

As shown in FIG. 1, the personal computer 10 is also connected to the remote server 225 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art can recognize that the modem 35 may also be internal to the personal computer 10, thus communicating directly via the system bus 18. It is important to note that connection to the remote server 225 via both the local area network 12 and the wide area network 13 is not required, but merely illustrates alternative methods of providing a communication path between the personal computer 10 and the remote server 225.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, browser 213, script 205, component object 250, other software modules 38, and data are provided to the personal computer 10 via computer-readable media. In the preferred computer, the computer-readable media include the local or remote memory storage devices, which may include the local hard disk drive 20, floppy disk 23, CD-ROM or DVD 26, RAM 17, ROM 16, and the remote memory storage device 33. In the preferred personal computer 10, the local hard disk drive 20 is used to store data and programs, including the operating system and programs.

Figure 2:
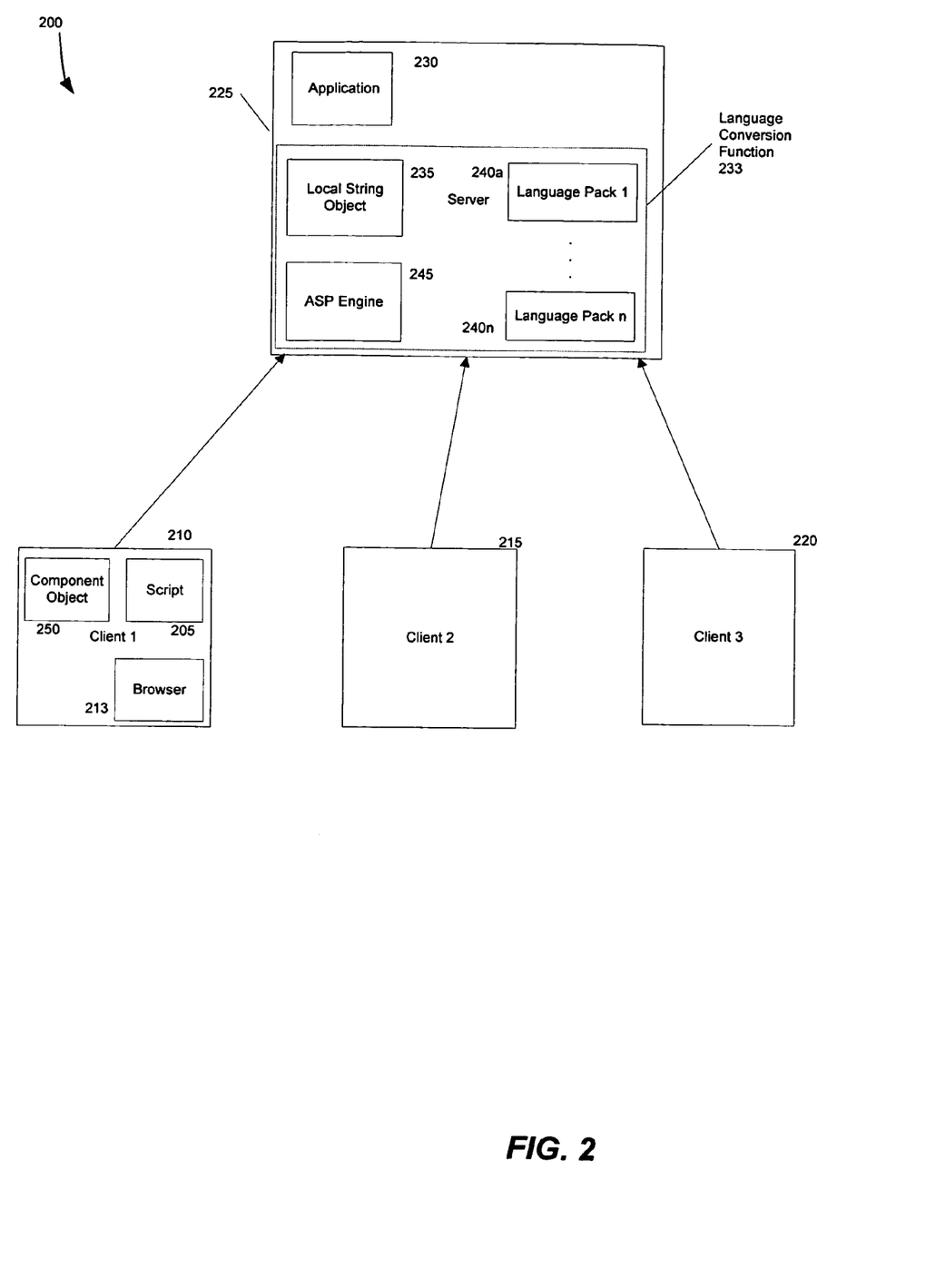
FIG. 2 is a functional block diagram illustrating the architecture of a distributed computer network in accordance with an exemplary embodiment of the present invention.

Referring now to FIG. 2, an exemplary architecture of the present invention will be described. FIG. 2 illustrates an exemplary system 200 for providing a localizable application. The system 200 includes clients 210, 215, and 220 and a server 225 and comprises a distributed computing environment. The server 225 receives digital signals from and sends digital signals to the clients 210, 215, and 220, typically via a distributed computer network, such as the Internet. A browser 213 enables client 1 210 to present digital content, based upon digital signals transmitted from the server 225. The server further comprises software modules including an application 230 and a language conversion function 233. The language conversion function 233 comprises a local string object 235, an Active Server Page Engine 245, and language packs 240a through 240n.

Client 1 210 can include a script 205, a browser 213, and a component object 250. Using the browser 213, client 1 210 can access an application 230 on the server 225. The local string object 235 determines the language the application 230 will be converted into based upon a client language preference. A language pack 240a is selected that matches the language selected by the local string object 235. A simplified version of the language pack 240a, called the component object 250, is downloaded to the client. The language pack 240a provides a translation for the content of the application 230. The translated content for the application 230 is then sent to the client 210 by the Active Server Page Engine 245 in a form that can be understood by the client. The script 205 can enhance the application 230 by pulling supplemental content from the application 230 with the browser 213 to client 1 210. The component object 250 at the client converts the supplemental content to the client's language preference. The script 205 can then render the supplemental content.

An example of an enhancement provided by the supplemental content is a popup window displayed on the client which provides travel information for a specific country. The browser 213 would retrieve encoded strings from the application with supplemental content concerning the travel information. The component object 250 residing on client 1 210 takes the supplemental content and converts it into the selected language for client 1 210. The converted supplemental content can then be processed by the script 205 residing on client 1 210 to render the popup window for client 1 210. The popup window would not have been available with the application client 1 210 retrieved from the server. However, the script 205 was able to provide the popup window with the supplemental content from the application 230. Moreover, the supplemental content is rendered in the selected language for client 1 210 because the encoded strings are converted by the component object 250 residing on client 1 210.

Figure 3:
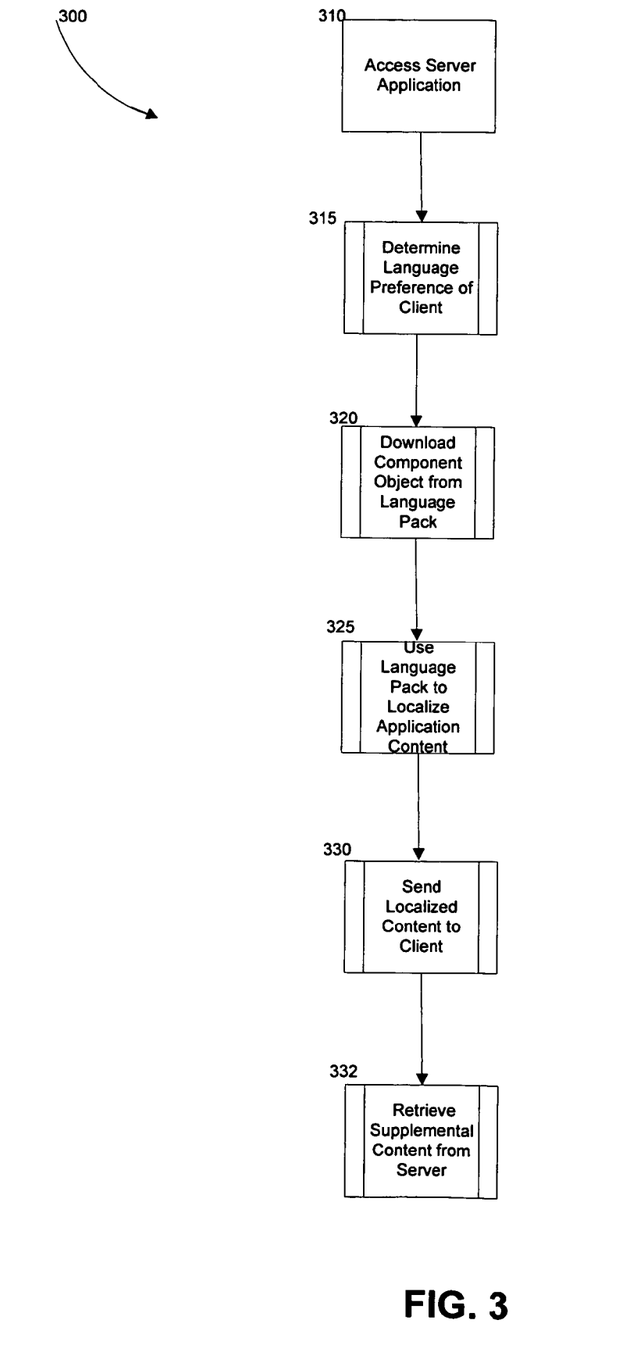
FIG. 3 is a logic flow diagram illustrating an overview of an exemplary process for converting a Web application with scripts into a language selected by a client.

FIG. 3 is a logic flow diagram illustrating an overview of exemplary steps for a language localization process. Referring now to FIGS. 2 and 3, a process 300 is begun at step 310 with client 1 210 accessing an application 230 on a server 225. In step 315 the client's language preference is determined at the server 225. Once the client's language preference is determined, the browser 213 downloads the component object 250 in step 320 from the language pack 240a that supports the preferred language. In step 325 the selected language pack 240a supplies all of the elements that can be localized in the application 230. In step 330 the server 225 sends the localized application to the client 1 210. The script 205 can enhance the localized application with additional information the browser 213 pulls from the server 225. In step 332 the browser 213 retrieves encoded strings containing supplemental information from the application 230. The script 205 will use these strings to render enhancements not available with the basic application.

Figure 4:
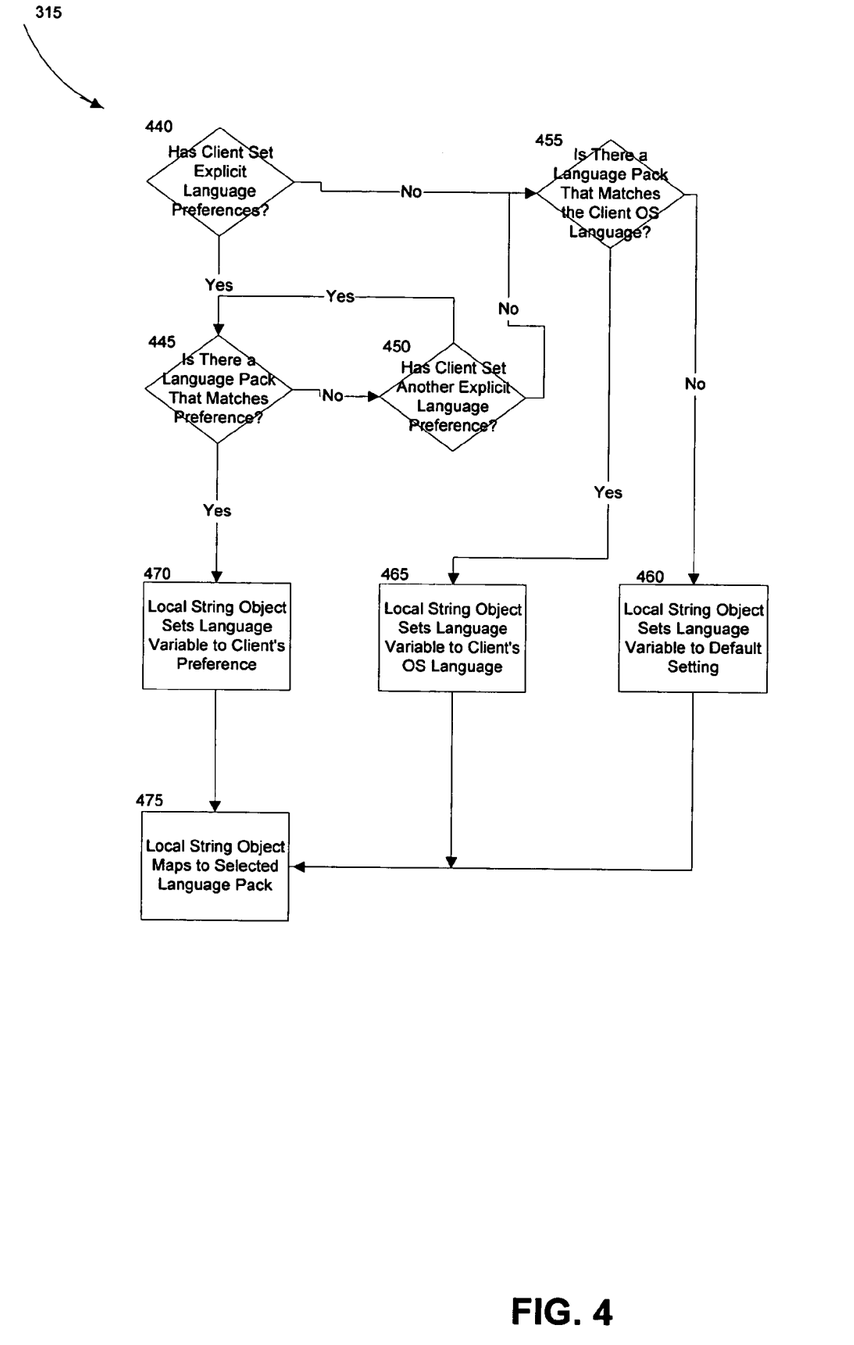
FIG. 4 is a logic flow diagram illustrating an exemplary process for determining a client's language preference.

FIG. 4 is a logic flow diagram illustrating in more detail the exemplary steps for determining a client's language preference. Beginning with step 440, the local string object, of task 315, 235 looks to the browser 213 to determine whether client 1 210 has set an explicit language preference. If client 1 210 has set explicit language preferences, they will be contained, in order of preference, in a signal that the browser 213 sends to the server 225 at the time of the initial access. If client 1 210 has not set an explicit language preference, the "No" branch is followed to step 455. If client 1 210 has set an explicit language preference, the "Yes" branch is followed to step 445. The local string object determines in step 445 whether there is a language pack that supports client 1's explicit language preference.

If there is a supporting language pack, the "Yes" branch is followed from step 445 to step 470. The local string object 235 in step 470 sets a language variable to the client's language preference. If in step 445 there is no matching language pack, the "No" branch is followed to step 450 where the local string object 235 determines whether the browser 213 has transmitted other explicit language preferences for client 1 210. If client 1 210 has made other explicit language preferences, the "Yes" branch is followed back to step 445 and this loop continues until either an explicit language preference is matched to a language pack or client 1's preferences are exhausted. When the explicit language preferences are exhausted in step 450, the "No" branch is followed to step 455.

If step 455 is reached, client 1 210 does not have explicit language preferences and, consequently, the browser 213 transmits the operating system language of the client 1 210 to the server 225. The local string object 235 determines whether there is a language pack that matches the client 1 operating system language. If there is a language pack matching the operating system language, the "Yes" branch is followed to step 465 and the language variable is set to correspond with the client 1 operating system language. If there is no language pack that matches the client 1 operating system language, the "No" branch is followed to step 460 and the local string object 235 sets the language variable to a default setting predetermined by the server.

In step 475 the local string object 235 looks at a list of the language packs on the server and selects the language pack 240a corresponding to the language variable. This language pack 240a will be used to convert, or localize, the string elements in the application into a particular language. Each language pack on the server contains the string conversions for a language.

Figure 5:
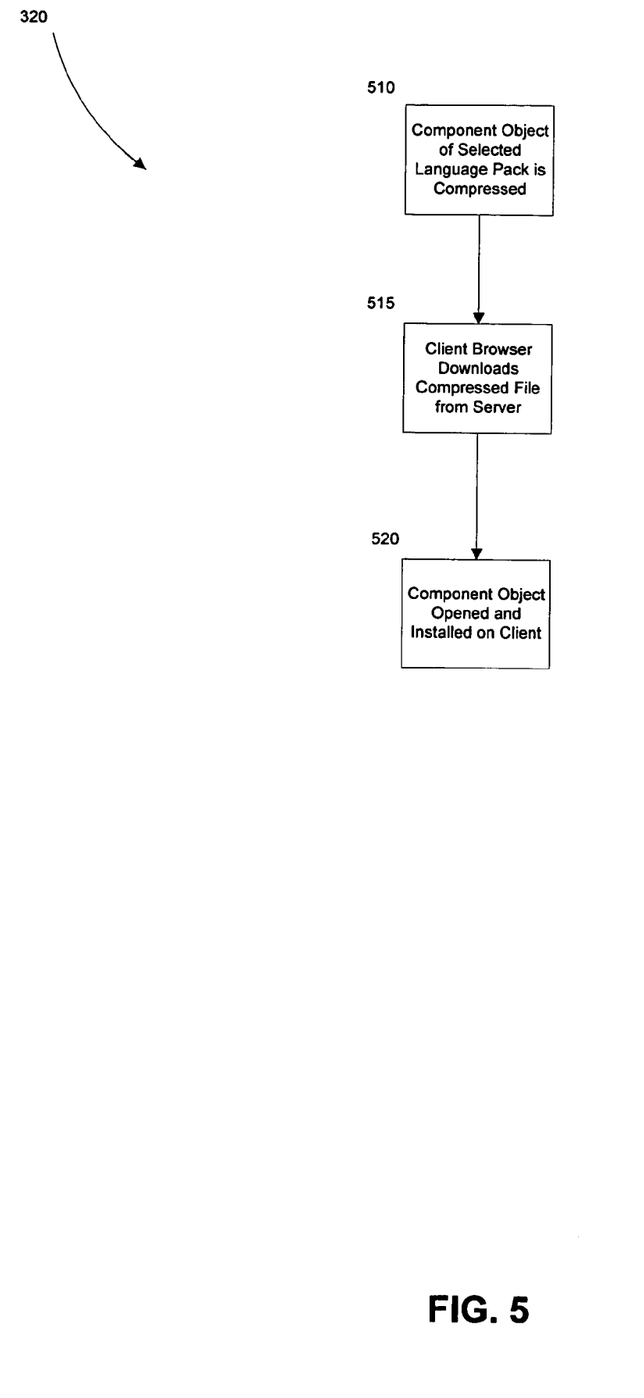
FIG. 5 is a logic flow diagram illustrating an exemplary process for selecting a language pack and downloading a component language pack.

In order to convert encoded strings containing supplemental content to be rendered by a script 205 residing on the client 1 210, a component object 250 must be installed on the client 1 210. FIG. 5 provides a detailed review of the steps for downloading a component object as represented in step 320 in FIG. 3. Referring to FIG. 5, in step 510, the local string object 235 pulls a simplified version of the selected language pack 240a, called the component object 250, from the selected language pack 240a. The local string object 235 packages the component object 250 in a compressed file for downloading. In step 515 the client browser 213 downloads the compressed file from the server 225. In step 520 the component object 250 is opened and installed on client 1 210. The component object 250 is then available to convert any encoded supplemental strings retrieved from the application into the selected language. Additional component objects for other languages may also be downloaded and installed on the client.

Figure 6:
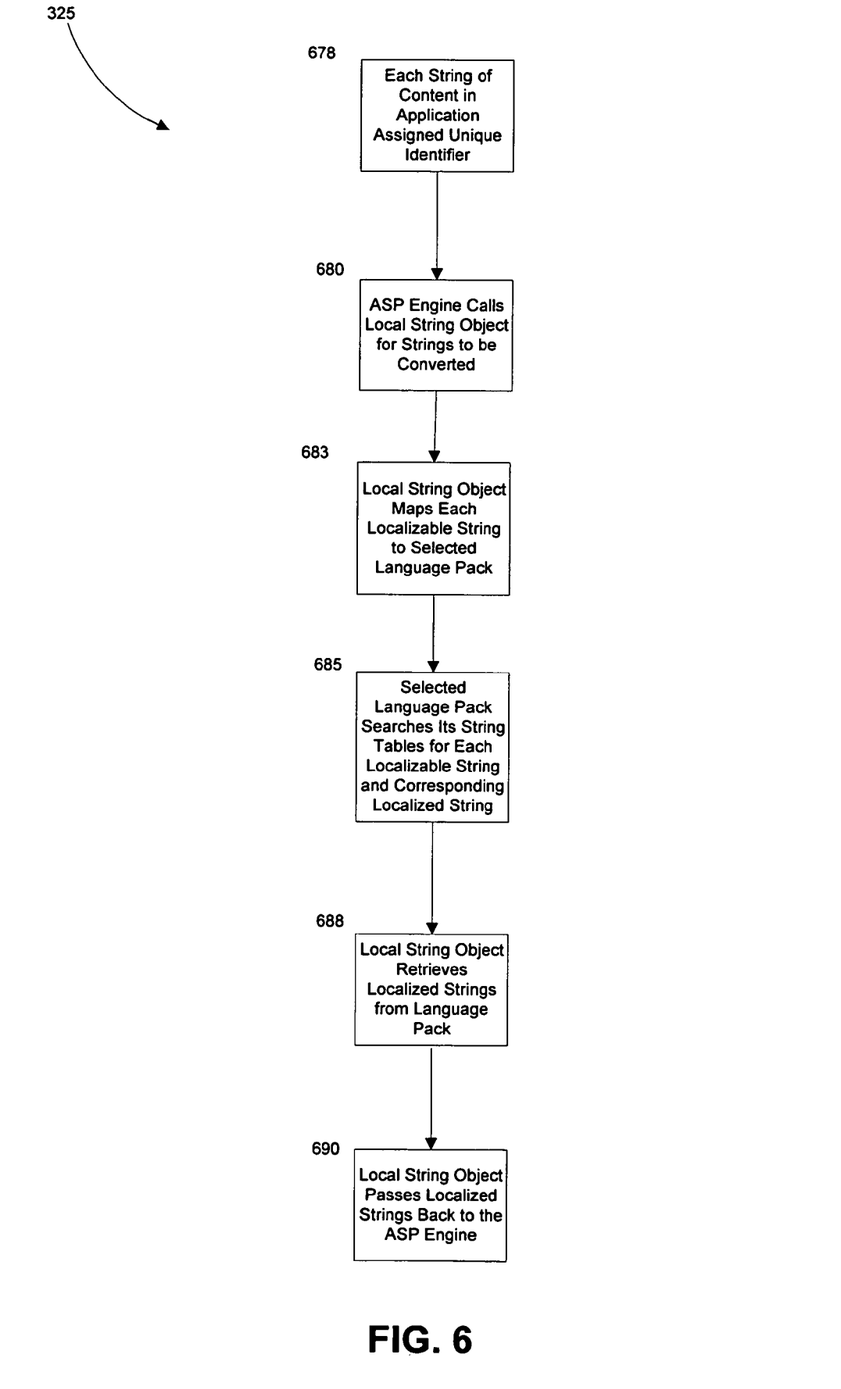
FIG. 6 is a logic flow diagram illustrating an exemplary process for localizing a Web application with a language pack.

FIG. 6 sets forth the detailed steps for converting an application 230 on a server 225 into a selected language which will ultimately be provided to a client. FIG. 6 provides the detailed steps represented by the process in step 325 of FIG. 3. Referring to FIG. 6, in step 678, each string of content in the application 230 is assigned a unique identifier. The unique identifier is used to locate the string in a table located within the selected language pack. In step 680, the ASP Engine 245, which renders the application content, calls the local string object for the localizable strings of content to be mapped. In response, the local string object maps the localizable strings of content in step 683 to the selected language pack 240a. Essentially, the mapping process is a search in the language pack for the string elements that make-up the application and their corresponding words or symbols in a specific language. In step 685, the language pack 240a searches its string tables for the unique identifier of each localizable string and the corresponding localized string. Once located, the local string object retrieves the localized strings from the language pack 240a in step 688. In step 690, the local string object 235 passes the localized strings back to the ASP Engine 245.

Figure 7:
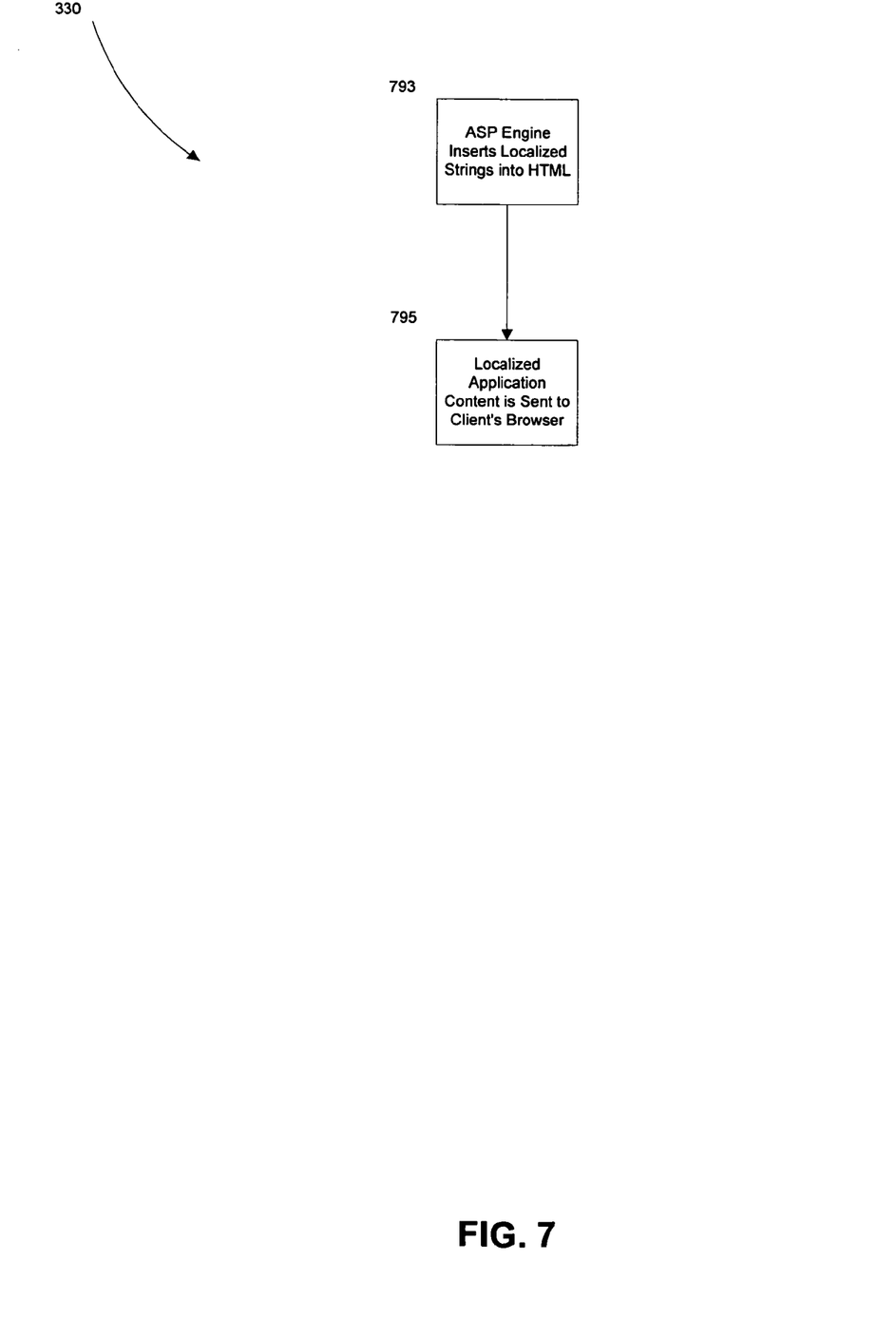
FIG. 7 is a logic flow diagram illustrating an exemplary process for sending a localized application to a client.

Once the content of the application 230 is converted into the desired language, the browser 213 retrieves it from the ASP Engine 245. FIG. 7 provides the detailed process represented in step 330 in FIG. 3. FIG. 7 illustrates an exemplary process for transmitting the application content from the server 225 to the client 1 210 in the desired language. In step 793, the ASP Engine 245 renders the application content in the selected language. This is typically accomplished by inserting the localized strings from the language pack 240a into HTML. Finally, the server 225 sends the localized application to the client's browser 213 as HTML content in step 795.

Figure 8:
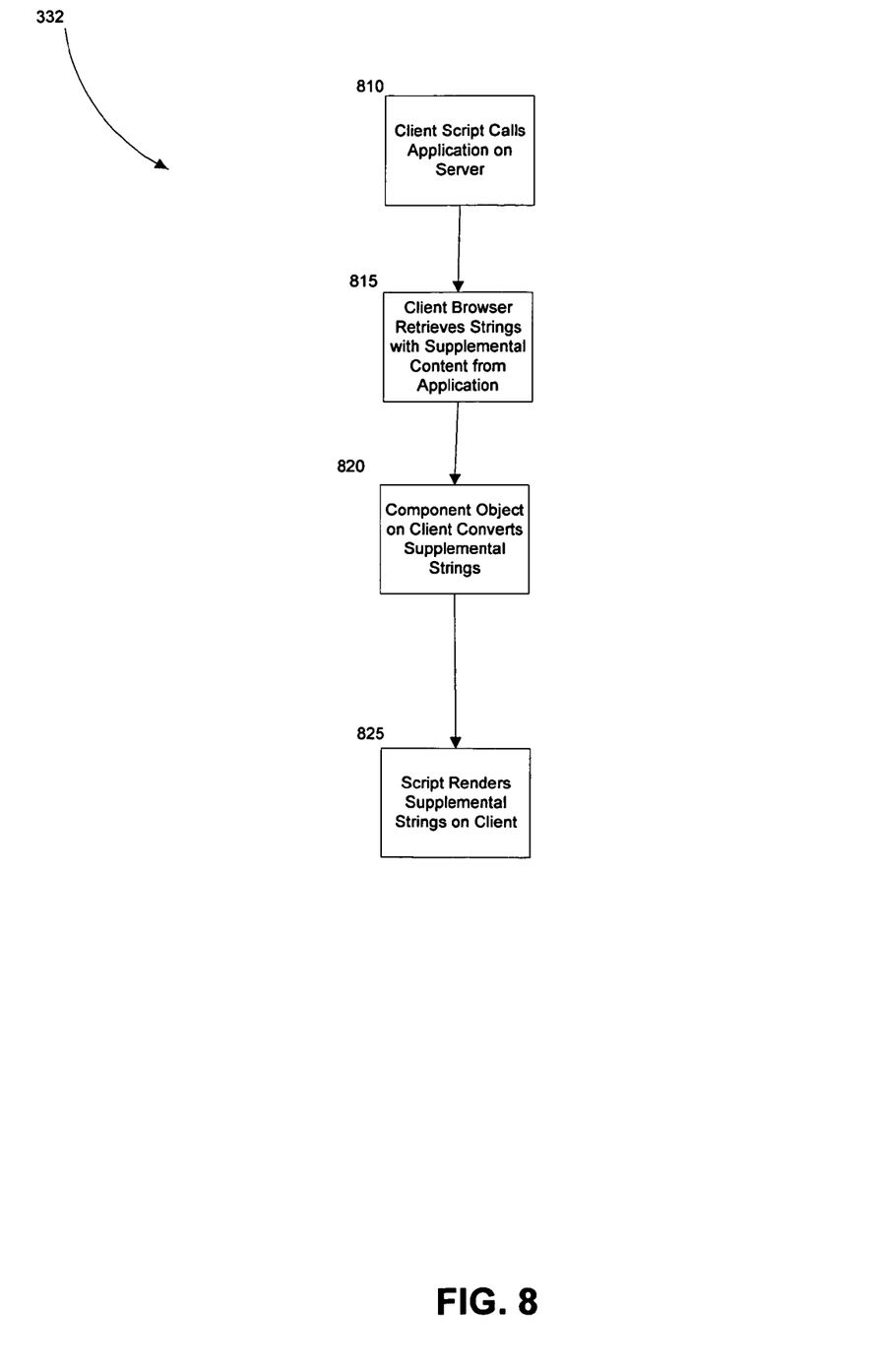
FIG. 8 is a logic flow diagram illustrating an exemplary process for retrieving supplemental strings from the application for the client scripts.

After the client 1 210 receives the converted application, the client browser may also retrieve supplemental content from the server for enhancing the application. FIG. 8 shows in greater detail the process represented in step 332 in FIG. 3. FIG. 8 is a logic flow diagram illustrating an exemplary process for retrieving supplemental strings for the script 205. The script 205 can provide additional material and features not ordinarily available with the application 230, such as popup menus and special graphics. In an alternative embodiment of the invention, an ActiveX control can be used to perform the function of the script. There may also be more than one script operating on a client.

In step 810, the script 205 residing on the client calls the application 230 located on the server 225 to request supplemental content for the application. In step 815, the browser 213 retrieves the strings containing the supplemental content from the application 230. At this point the strings are encoded with the supplemental content just as the content of the original application on the server is encoded in strings. By encoding the supplemental content, a single version can be maintained on the server as opposed to a separate version for every language. In step 820, the component object 250 converts the encoded content in the strings into the language corresponding with the selected language pack. The script 205 then renders the converted string on the client in the selected language in step 825. In other embodiments, there can be additional scripts on the client or there can be additional component objects to support other languages.

Client 1 210 now has the application 230 in a language it can understand. At the same time, another client 215 may retrieve the application 230 in a different language. While they are using the application 230, the clients 210 and 215 may change the language in which they are viewing the application by changing their language preference. A language pack 240n for the newly selected language translates the application 230 and then sends the newly translated version to the client. Scripts residing on clients 210 and 215 can retrieve supplemental content contained in strings in the application 230. Component objects residing on clients 210 and 215 can convert the supplemental content into the clients respective languages. Clients 210 and 215 may have multiple component objects to support several languages. Only one version of the application 230 and the supplemental content exists on the server 225 to facilitate any changes that need to be made. The variety of languages into which the application and the supplemental content can be translated is controlled by the various language packs installed on the server.

Those skilled in the art will appreciate that the invention has a wide range of applications beyond the environment of the World Wide Web. This method of language localization could be utilized in other types of distributed computing networks where there is a need to express content in varying languages. This method can also be used in a situation where the application resides on a personal computer and localization occurs either on the personal computer or on another logically connected computer.

The present invention operates in a distributed computing environment and permits a client to select the language in which a server provides an application. The application resides on the server in an encoded form. Once a client selects a desired language, the application is converted to that language with language pack software modules residing on the server. After the application is converted, the client's browser retrieves the converted application. Also, when the client selects a desired language, component objects corresponding to that language can be downloaded from the selected language pack software module to the client. In addition to the converted application, the client's browser can also pull supplemental content from the application on the server on the client for enhancement of the application. The component object downloaded to the client from the server converts the supplemental content, which is contained in encoded strings, and the content is passed to a script residing on the client. The script renders the supplemental information to provide features for the client such as popup menus and graphics.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalence thereof.

What is claimed is:

1. A computer-readable medium having computer-executable instructions for performing steps relating to converting to a preferred language supplemental content of an application received from a server, the steps performed at a client, comprising:

determining the preferred language;
   providing an indication of the determined preferred language to the server;
   receiving the application from the server, wherein the application is received in the preferred language;
   downloading a language pack corresponding to the preferred language, the language pack comprising localized strings and string identifiers associated with the localized strings;
   retrieving supplemental content of the application from the server, the supplemental content having identifiers for localizable strings;
   finding a localizable string identifier of the retrieved supplemental content in the downloaded language pack, wherein the finding includes matching the localizable string identifier of the supplemental content with a localized string identifier of the downloaded language pack; and
   utilizing a localized string corresponding to the found localizable string identifier to provide localized supplemental content.

2. The computer-readable medium of claim 1 wherein the utilizing includes reading the localized string corresponding to the found localizable string identifier from the language pack and providing the read localized string to a web browser operating at the client.

3. The computer-readable medium of claim 1 wherein the language pack further comprises a component object and the finding is performed by the component object.

4. The computer-readable medium of claim 1 wherein the determining includes receiving an indication of an explicit language preference.

5. The computer-readable medium of claim 1 wherein the determining includes determining a language of an operating system of the client.

6. The computer-readable medium of claim 1 wherein the downloading includes downloading a component object.

7. The computer-readable medium of claim 1 wherein the supplemental content is a pop-up menu.

8. The computer-readable medium of claim 1 wherein a script operating at the client retrieves the supplemental content and provides the localized supplemental content.

9. The computer-readable medium of claim 1 wherein a script operating at the client requests a component object to provide the localized supplemental content.

10. A method of converting supplemental content of a server-based application into a preferred language of a client, comprising:

determining the preferred language;
   providing an indication of the determined preferred language to the server;
   receiving the application from the server, wherein the application is received in the preferred language;
   downloading a language pack corresponding to the preferred language, the language pack comprising localized strings and string identifiers associated with the localized strings;
   retrieving supplemental content of the application from the server, the supplemental content having identifiers for localizable strings;
   finding a localizable string identifier of the retrieved supplemental content in the downloaded language pack, wherein the finding includes matching the localizable string identifier of the supplemental content with a localized string identifier of the downloaded language pack; and
   utilizing a localized string corresponding to the found localizable string identifier to provide localized supplemental content.

11. The method of claim 15 wherein the language pack further comprises an identifier for each localized string.

12. The method of claim 15 including providing a component object to the client.

13. The method of claim 12 wherein the component object retrieves localized strings from the language pack.

14. The method of claim 10 wherein the language pack is associated with the received indication of the preferred language and comprises supplemental content that is localized into the indicated preferred language.

15. A system for converting to a preferred language supplemental content of an application received from a server, comprising:
   a component that determines the preferred language, provides an indication of the determined preferred language to the server, receives the application from the server, wherein the application is received in the preferred language, and downloads a language pack corresponding to the preferred language, the language pack comprising localized strings and string identifiers associated with the localized strings; and
   a component that retrieves supplemental content of the application from the server, the supplemental content having identifiers for localizable strings, finds a localizable string identifier of the retrieved supplemental content in the downloaded language pack and matches the localizable string identifier of the supplemental content with a localized string identifier of the downloaded language pack, and utilizes a localized string corresponding to the found localizable string identifier to provide localized supplemental content.

16. The system of claim 15 wherein the language pack further comprises a component object that localizes the supplemental content.

17. The system of claim 15 wherein a component object is downloaded with the language pack.

18. The system of claim 15 wherein the supplemental content is a pop-up menu.

19. The system of claim 15 wherein a script operating at the client retrieves and localizes the supplemental content.

20. The system of claim 15 wherein a script operating at the client requests a component object to provide the localized supplemental content.

* * * * *

UNITED STATES PATENT AND TRADEMARK OFFICE
CERTIFICATE OF CORRECTION

PATENT NO. : 6,993,568 B1
APPLICATION NO. : 09/704073
DATED : January 31, 2006
INVENTOR(S) : Ludovic Hauduc et al.

It is certified that error appears in the above-identified patent and that said Letters Patent is hereby corrected as shown below:

In column 5, line 13, delete "in" and insert -- into --, therefor.

In column 9, line 43, delete "on" and insert -- to --, therefor.

In column 11, line 1, in Claim 11, delete "claim 15" and insert -- claim 10 --, therefor.

In column 11, line 3, in Claim 12, delete "claim 15" and insert -- claim 10 --, therefor.

Signed and Sealed this

Eleventh Day of August, 2009

David J. Kappos
*Director of the United States Patent and Trademark Office*